(12) United States Patent
Storbekk

(10) Patent No.: US 7,629,703 B2
(45) Date of Patent: Dec. 8, 2009

(54) WAVE POWER GENERATING PLANT

(75) Inventor: Robert Storbekk, Bergen (NO)

(73) Assignee: Power Vision AS, Bergen (NO)

( * ) Notice: Subject to any disclaimer, the term of this patent is extended or adjusted under 35 U.S.C. 154(b) by 99 days.

(21) Appl. No.: 11/575,133

(22) PCT Filed: Sep. 8, 2005

(86) PCT No.: PCT/NO2005/000326

§ 371 (c)(1),
(2), (4) Date: Apr. 10, 2007

(87) PCT Pub. No.: WO2006/031121

PCT Pub. Date: Mar. 23, 2006

(65) Prior Publication Data

US 2008/0036213 A1    Feb. 14, 2008

(30) Foreign Application Priority Data

Sep. 13, 2004    (NO) .................... 20043825

(51) Int. Cl.
F03B 13/10    (2006.01)
F03B 13/12    (2006.01)
F03B 13/00    (2006.01)

(52) U.S. Cl. ........................ 290/53; 290/42

(58) Field of Classification Search ............ 290/42, 290/53
See application file for complete search history.

(56) References Cited

U.S. PATENT DOCUMENTS

| | | | | |
|---|---|---|---|---|
| 632,826 A * | 9/1899 | Rice | ............ | 417/332 |
| 1,244,309 A * | 10/1917 | Fox | ............ | 417/332 |
| 1,497,205 A | 6/1924 | Boosinger | ............ | 60/605 |
| 1,766,457 A * | 6/1930 | Ruth | ............ | 417/332 |
| 3,204,110 A | 8/1965 | Yoshio | ............ | 290/42 |
| 3,777,494 A * | 12/1973 | Soderlund | ............ | 60/507 |
| 4,013,382 A * | 3/1977 | Diggs | ............ | 417/332 |
| 4,076,463 A * | 2/1978 | Welczer | ............ | 417/331 |
| 4,077,213 A * | 3/1978 | Hagen | ............ | 60/500 |
| 4,091,618 A * | 5/1978 | Jackson | ............ | 60/497 |
| 4,092,828 A * | 6/1978 | Garza | ............ | 60/506 |
| 4,105,368 A * | 8/1978 | Waters | ............ | 417/53 |
| 4,111,610 A * | 9/1978 | Brown | ............ | 417/332 |
| 4,125,346 A * | 11/1978 | Pickle | ............ | 417/332 |
| 4,206,601 A * | 6/1980 | Eberle | ............ | 60/398 |
| 4,210,821 A * | 7/1980 | Cockerell | ............ | 290/53 |
| 4,241,579 A * | 12/1980 | Borgren | ............ | 60/504 |
| 4,326,840 A * | 4/1982 | Hicks et al. | ............ | 417/331 |
| RE31,111 E * | 12/1982 | Hagen | ............ | 60/500 |
| 4,392,349 A * | 7/1983 | Hagen | ............ | 60/500 |
| 4,398,095 A * | 8/1983 | Ono | ............ | 290/53 |

(Continued)

FOREIGN PATENT DOCUMENTS

DE    19615115    10/1997

*Primary Examiner*—Nicholas Ponomarenko
*Assistant Examiner*—Pedro J Cuevas
(74) *Attorney, Agent, or Firm*—Christian D. Abel

(57) ABSTRACT

A wave power generating plant comprising an arrangement (20) of interconnected floating units (22). The arrangement (20) is anchored to the seabed via mooring buoys (26). Each floating unit comprises a floating pontoon (40), a stabilizer unit (44) and connecting means (48) for the interconnection of the floating units (22). The power is produced by relative vertical motion of the floating units (22), while each floating unit (22) is simultaneously locked in the horizontal plane.

6 Claims, 4 Drawing Sheets

U.S. PATENT DOCUMENTS

| | | | | |
|---|---|---|---|---|
| 4,408,454 A * | 10/1983 | Hagen et al. | ................... | 60/500 |
| 4,421,461 A * | 12/1983 | Hicks et al. | ................... | 417/53 |
| 4,512,886 A * | 4/1985 | Hicks et al. | ............ | 210/170.05 |
| 4,560,884 A * | 12/1985 | Whittecar | .................... | 290/42 |
| 4,594,853 A * | 6/1986 | Raichlen et al. | ............... | 60/502 |
| 4,622,473 A | 11/1986 | Curry | .......................... | 290/53 |
| 4,684,815 A * | 8/1987 | Gargos | ......................... | 290/53 |
| 4,698,969 A * | 10/1987 | Raichlen et al. | ............... | 60/502 |
| 4,742,241 A | 5/1988 | Melvin | ........................ | 290/53 |
| 4,754,157 A * | 6/1988 | Windle | ........................ | 290/53 |
| 5,186,822 A * | 2/1993 | Tzong et al. | ................ | 210/122 |
| 5,247,899 A | 9/1993 | Boesser | ...................... | 114/263 |
| 5,394,695 A * | 3/1995 | Sieber | ......................... | 60/398 |
| 5,411,377 A * | 5/1995 | Houser et al. | ............... | 417/333 |
| 5,435,134 A * | 7/1995 | Nielsen | ........................ | 60/398 |
| 5,846,028 A * | 12/1998 | Thory | .................... | 405/195.1 |
| 5,854,516 A * | 12/1998 | Shim | .......................... | 290/53 |
| 5,975,865 A * | 11/1999 | Manabe | ...................... | 417/331 |
| 6,140,712 A * | 10/2000 | Fredriksson et al. | .......... | 290/53 |
| 6,226,989 B1 | 5/2001 | Fredriksson et al. | .......... | 60/501 |
| 6,291,904 B1 * | 9/2001 | Carroll | ........................ | 290/53 |
| 6,328,539 B1 * | 12/2001 | Hung | .......................... | 417/330 |
| 6,388,342 B1 * | 5/2002 | Vetterick et al. | .............. | 290/53 |
| 6,392,314 B1 * | 5/2002 | Dick | .......................... | 290/53 |
| 6,476,511 B1 * | 11/2002 | Yemm et al. | .................. | 290/42 |
| 6,647,716 B2 * | 11/2003 | Boyd | .......................... | 60/398 |
| 6,731,018 B1 * | 5/2004 | Grinsted et al. | ............... | 290/42 |
| 6,768,216 B1 * | 7/2004 | Carroll et al. | ................. | 290/42 |
| 6,812,588 B1 * | 11/2004 | Zadig | .......................... | 290/53 |
| 6,849,963 B2 * | 2/2005 | Grinsted et al. | ................ | 290/42 |
| 6,857,266 B2 * | 2/2005 | Dick | .......................... | 60/496 |
| 6,953,328 B2 * | 10/2005 | Welch et al. | ................. | 417/333 |
| 7,023,104 B2 * | 4/2006 | Kobashikawa et al. | ........ | 290/42 |
| 7,059,123 B2 * | 6/2006 | Welch et al. | ................... | 60/398 |
| 7,121,536 B2 * | 10/2006 | Ruzicka et al. | ............... | 261/91 |
| 7,245,041 B1 * | 7/2007 | Olson | .......................... | 290/53 |
| 7,257,946 B2 * | 8/2007 | Welch, Jr. | .................... | 60/398 |
| 7,258,532 B2 * | 8/2007 | Welch et al. | ................. | 417/333 |
| 7,331,174 B2 * | 2/2008 | Welch et al. | ................... | 60/398 |
| 7,339,285 B2 * | 3/2008 | Negron | ........................ | 290/53 |
| 7,391,127 B2 * | 6/2008 | Ayntrazi | ...................... | 290/53 |
| 7,535,117 B2 * | 5/2009 | Montgomery | ................ | 290/53 |
| 2003/0121255 A1 * | 7/2003 | Dick | .......................... | 60/398 |
| 2004/0007881 A1 * | 1/2004 | Kobashikawa et al. | ........ | 290/53 |
| 2004/0201223 A1 * | 10/2004 | Grinsted et al. | ............... | 290/54 |
| 2005/0123353 A1 * | 6/2005 | Dick | .......................... | 405/75 |
| 2006/0097520 A1 * | 5/2006 | Ayntrazi | ...................... | 290/53 |
| 2006/0202483 A1 * | 9/2006 | Gonzalez | ..................... | 290/53 |
| 2006/0230750 A1 * | 10/2006 | Welch et al. | ................... | 60/398 |
| 2006/0233613 A1 * | 10/2006 | Welch et al. | ................... | 405/76 |
| 2006/0273593 A1 * | 12/2006 | Yemm | ......................... | 290/42 |
| 2007/0102937 A1 * | 5/2007 | Resen Steenstrup et al. | .. | 290/53 |
| 2007/0108773 A1 * | 5/2007 | Resen Steenstrup et al. | .. | 290/53 |
| 2007/0130929 A1 * | 6/2007 | Khan et al. | ................... | 60/398 |
| 2007/0158950 A1 * | 7/2007 | Crespo | ........................ | 290/53 |
| 2007/0193265 A1 * | 8/2007 | Skotte et al. | .................. | 60/495 |
| 2008/0001410 A1 * | 1/2008 | Welch, Jr. | .................... | 290/53 |
| 2008/0122225 A1 * | 5/2008 | Smith | .......................... | 290/42 |
| 2008/0238103 A1 * | 10/2008 | Montgomery | ................ | 290/53 |

* cited by examiner

WAVE POWER GENERATING PLANT

The present invention relates to a wave power generating plant comprising an arrangement of interconnected floating units, where each floating unit comprises a floating pontoon, a stabiliser unit and connecting means for the interconnection of the floating units. The power is produced by relative vertical motion of the floating units while each floating unit is locked in the horizontal plane, with the result that the waves move the floating units in a controlled manner in the horizontal plane so that they only move vertically.

In the patent literature a number of proposals are known for the design of wave power generating plants in order to exploit the energy in the waves to produce electric energy.

U.S. Pat. No. 4,742,241 discloses a device for converting wave energy into an exploitable form of energy, and particularly into fluid pressure. The device comprises a common frame structure with a large number of floating devices connected to energy converters.

U.S. Pat. No. 4,622,473 discloses an offshore platform with a plurality of floating elements suspended beneath it. The floating elements move vertically upwards as a wave crest passes, and gravity causes the floating elements to move vertically downwards as a wave trough passes. The vertical motion is utilised to pump a fluid at pressure through a hydraulic system, whereupon the pressure is utilised to generate electric energy which is brought ashore by means of cables.

U.S. Pat. No. 3,204,110 discloses a wave power generating plant with two floating bodies that are interconnected by a bolt connection, where there is also provided a curved toothed rack and a cogwheel for transfer of energy to a shaft by means of relative motion between the floating bodies and the bolt connection.

Furthermore, U.S. Pat. No. 1,497,205 discloses a wave power generating plant comprising floating bodies that can move vertically in the waves. In each corner of each floating body, a post and toothed racks are mounted to the floating body, and the toothed racks drive a shaft mounted on the top of the wave power generating plant.

In other words, it is generally known that power can be produced by converting a hydraulic pressure generated by waves into electric power in a generator. The disadvantages of the prior art, however, are many, but above all there is the problem that floating bodies moving in the waves are unstable, moving in an unfavourable manner relative to one another so that it is difficult to achieve a good relative motion that can be utilised for creating, for example, a hydraulic pressure.

The object of the present invention is to provide a wave power generating plant that avoids the drawbacks mentioned above. A further object is to achieve a relative motion between the various floating units that is suitable for creating a hydraulic pressure while at the same time the connection between the units can be employed for driving a hydraulic pump, preferably concealed in order to shield it from the influence of the waves and the environment. Furthermore, it is an object that the relative motion should be as stable as possible. Altogether this permits hydraulic fluid to be pumped in several "links" from one element to the next and on to a generator, thus optimising the wave motion. This solution, moreover, will be favourable from the economic point of view as it offers a solution with few generators and many pump units.

On the basis of the above-mentioned objects and prior art, therefore, the present invention has been produced for a wave power generating plant comprising an arrangement of interconnected floating units. The arrangement is anchored to the seabed via mooring buoys, where each floating unit comprises a floating pontoon, a stabiliser unit and connecting means for the interconnection of the floating units. The present invention is characterised in that the connecting means permit a free vertical motion of the floating units relative to one another, while at the same time the connecting means keep the interconnected floating units in a substantially constant relationship to one another in the horizontal plane, whereby the relative vertical motion of the floating units due to wave influence is transferred through an energy transmission device which in turn drives a power-producing unit.

This provides a solution where the floating units move in a controlled manner in a relative vertical motion. The pumping motion can be performed between each unit by a suitable transmission and several units can pump to a common generator unit either in series or in parallel.

In a preferred embodiment the wave power generating plant comprises a hydraulic system comprising a number of pump units for generating pressure in a hydraulic fluid in the hydraulic system, and at least one unit for utilisation of the pressure generated in the hydraulic fluid for production of electric energy.

It is also preferred that the pump units are driven by the relative vertical motion of the floating units, preferably by the floating units comprising a horizontal toothed rack which by means of relative motion of the floating unit relative to adjacent floating units rotates a cogwheel in the adjacent floating unit, whereupon the cogwheel drives one of the pump units. In an alternative embodiment, energy is generated by providing hydraulic cylinders between the floating units, which drive the fluid in the hydraulic system by the relative motion of the floating units.

It is a significant advantage of the present invention that the floating units are locked in the horizontal direction so that they only move vertically, thus enabling this relative motion to be exploited in order to drive a pump for hydraulic fluid which in turn drives a generator for electric power. In different embodiments the fluid may be both liquid and gas.

The present invention will now be described by means of a preferred embodiment with reference to the attached drawings:

In FIG. 7 the float is integrated in and attached to the framework.

Figure 1:
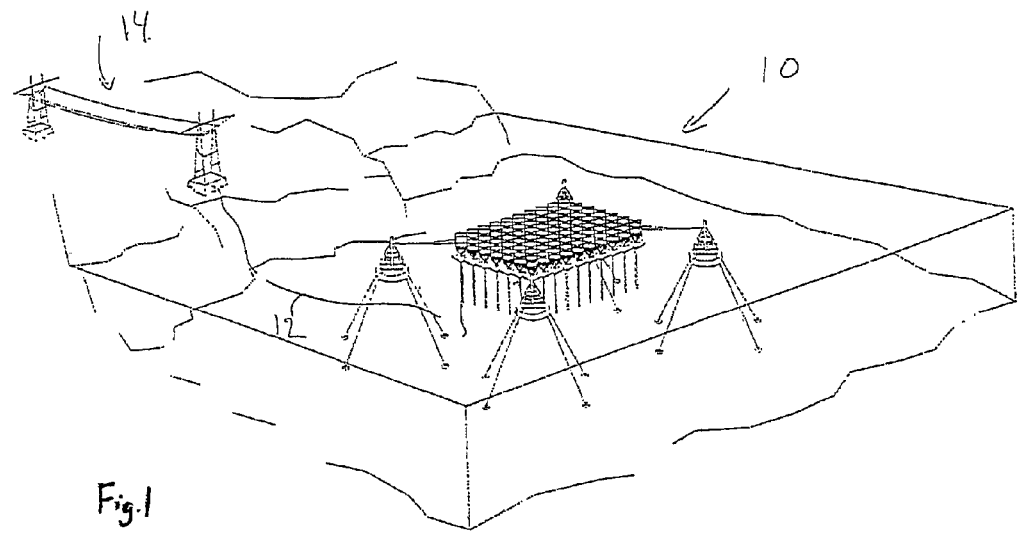
FIG. 1 illustrates the power plant according to the invention located in the water.

We now refer to FIG. 1, where a power plant 10 according to the invention is placed in the water. A submarine cable 11 conveys the produced electric energy to land, where power lines 14 transport the energy on to consumers.

Figure 2:
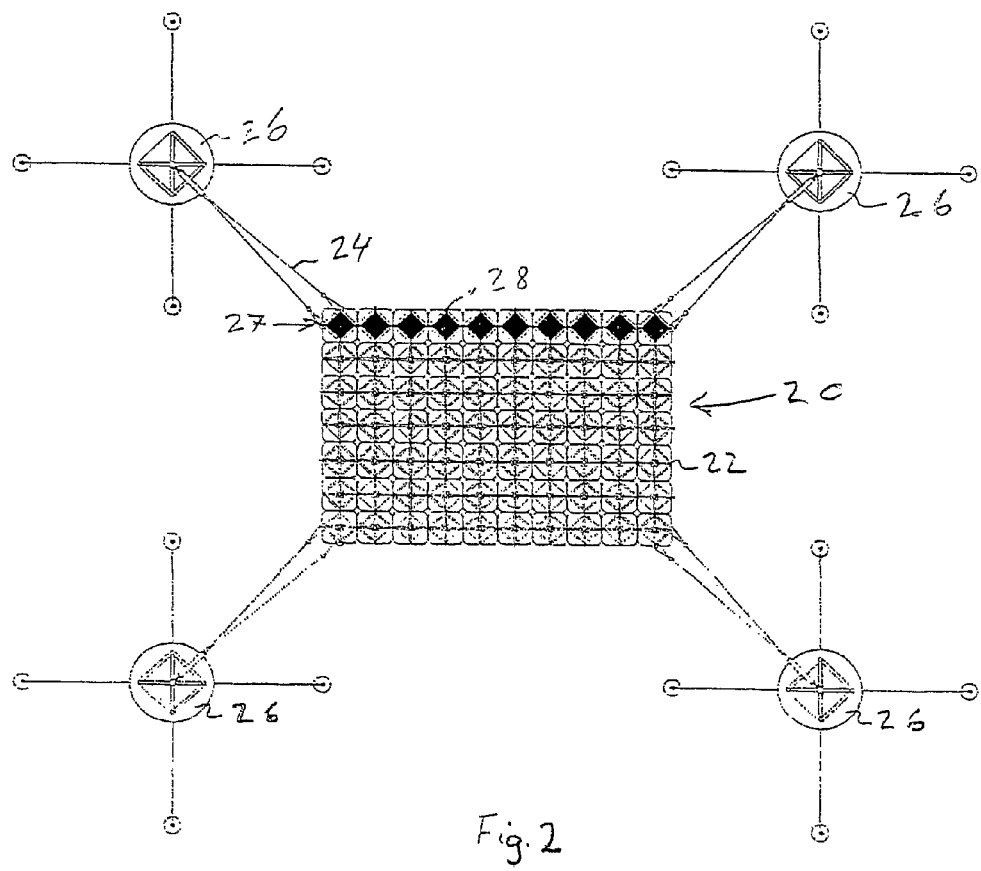
FIG. 2 is an illustration of the power plant viewed from above.

The power plant in the preferred embodiment consists of an arrangement 20 of floating units 22 (FIG. 2). Here the arrangement 20 consists of an array of ten times seven floating units 22. In each corner the arrangement 20 is mounted by means of one or more wires 24 in a mooring buoy 26, which anchors the arrangement 20 to the seabed.

A row 27 of floating units comprises generating units 28, this row being illustrated at the top of FIG. 2 and marked by black areas. The generating units 28 will be described in detail later.

Figure 3:
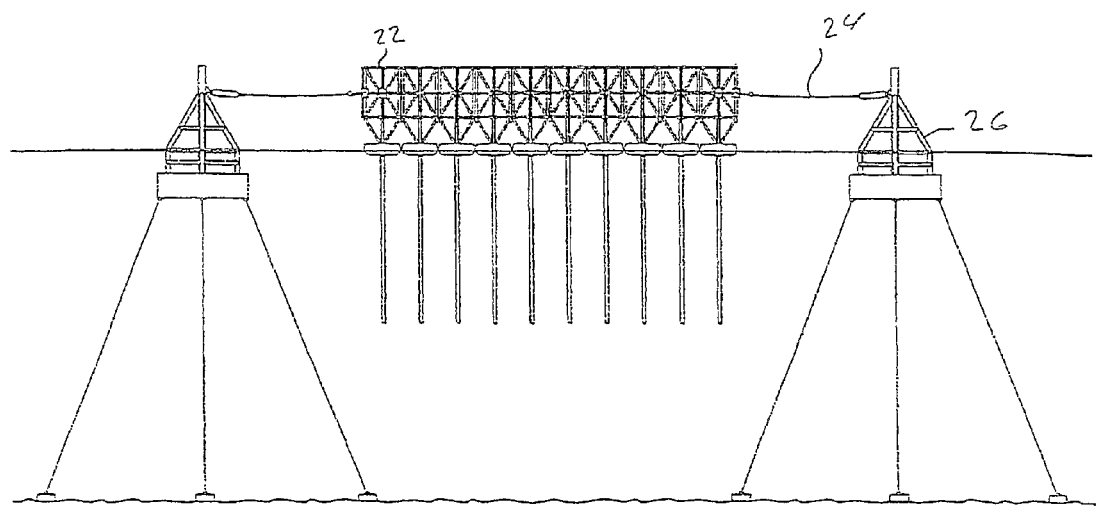
FIG. 3 is an illustration of the power plant viewed from the side.

FIG. 3 illustrates how the mooring buoys 26 are anchored to the seabed. It should be noted that the wires 24 are equipped with tension accumulators (not shown) for absorbing tension forces. At the same time the wires 24 are adapted in length so that tidal variations do not influence the arrangement.

Figure 4:
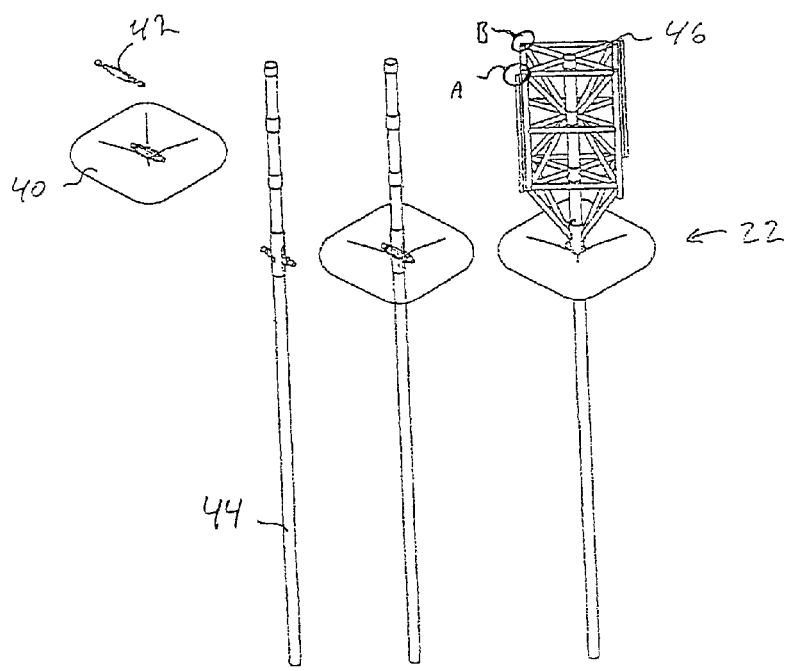
FIG. 4 illustrates the floating unit and components thereof.

A floating unit 22 is illustrated in detail in FIG. 4. The floating unit 22 comprises a float 40 attached by means of an articulated joint 42 to a cylindrical rod or stabiliser unit 44. To the stabiliser unit 44, above the float 40, is attached a framework 46, which absorbs forces in the horizontal and vertical direction for each floating unit 22. The float 40 is made of an outer layer of glass fibre or the like, and provides buoyancy to the floating unit 22. The float 40 is substantially rounded in shape to enable it to move flexibly over the waves, and the articulated joint 22 also assists in this since the float 40 can pivot both about the longitudinal axis of the articulated joint 42 and about the axis perpendicular thereto, at the attachment of the articulated joint 42 to the stabiliser unit 44.

The stabiliser unit 44 is elongated, extending at a depth beneath the surface. The stabiliser unit 44 preferably consists of a steel pipe filled with concrete or the like, and its purpose is to stabilise the floating unit 22 in the water so that it maintains a stable vertical position, while at the same time the stabiliser unit 44 will be able to have a damping effect on the dynamic moment forces that may influence the floating unit 22 due to wave motion.

The floating units 22 are interconnected by attachment means 48 in the framework 46. The attachment means 48 are illustrated in detail in sections A and B in FIG. 5, taken from FIG. 4. The attachment means 48 are mounted at each corner of the framework 46, and comprise a substantially protruding element 50 (section A) adapted to be able to be received in a substantially hollow element 52 (section B). In the embodiment, therefore, each floating element can be attached to four other floating elements.

Figure 5:
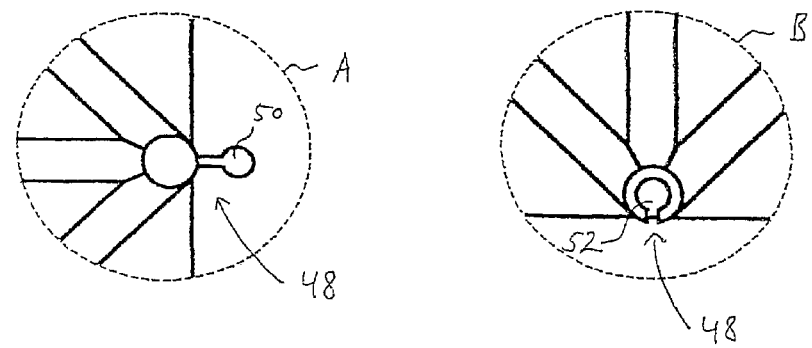
FIG. 5 is a cross section of connecting means for interconnecting several floating units, taken as a section from FIG. 4.

It should be noted that the attachment means 48 in FIG. 5 are illustrated from above, and that in FIG. 4 it can be seen that the attachment means 48 have a longitudinal extension. By this means the protruding element 50 can be moved up and down in the vertical direction relative to the hollow element 52. At the same time it can be seen that the attachment means 48 prevent relative horizontal motion of the floating units 22.

Figure 6:
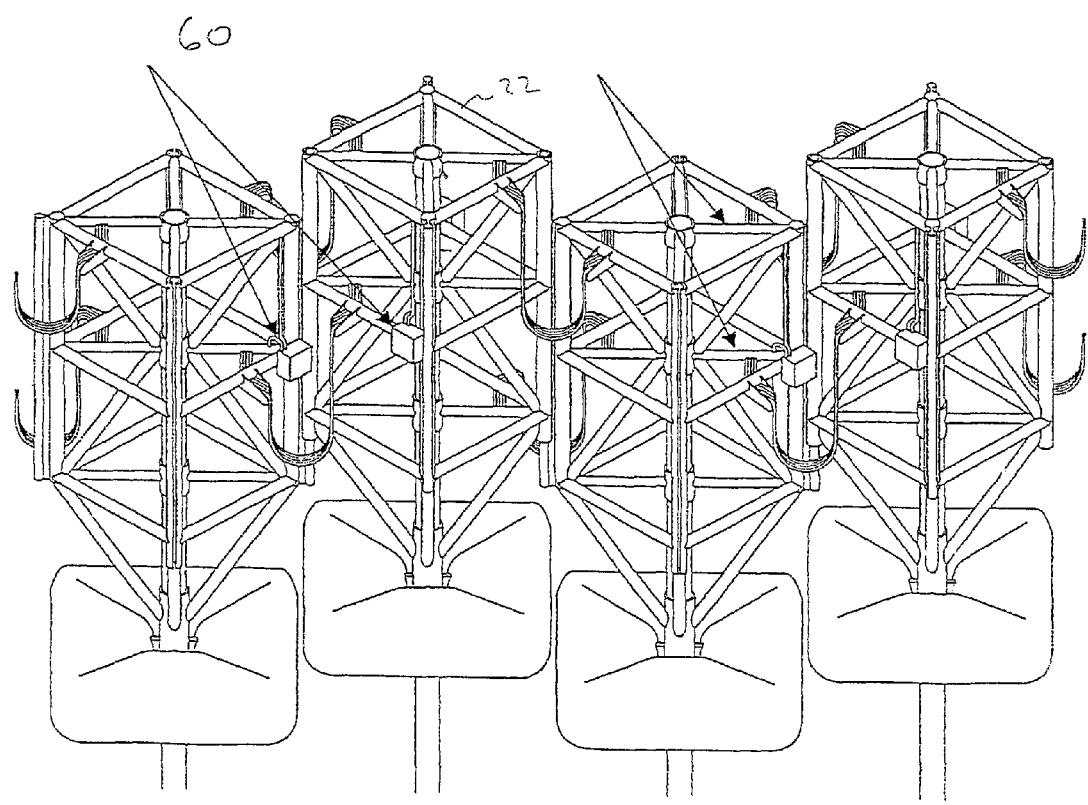
FIG. 6 illustrates the relative vertical motion of several interconnected floating units in perspective.

This is also illustrated in more detail in FIG. 6, where four floating units 22 are shown displaced relative to one another in the vertical direction. Also depicted here are parts of a hydraulic system 60. The hydraulic system 60 comprises a number of pump units, which can be seen as a number of rectangular boxes in FIG. 6. These pump units are driven by a rotating cogwheel that runs along a toothed rack along the corner of the framework 46 in the adjacent floating unit. The pump unit will be driven when there is relative vertical motion of the floating units, and hydraulic fluid will be pumped to the above-mentioned generating units 28.

Figure 7:
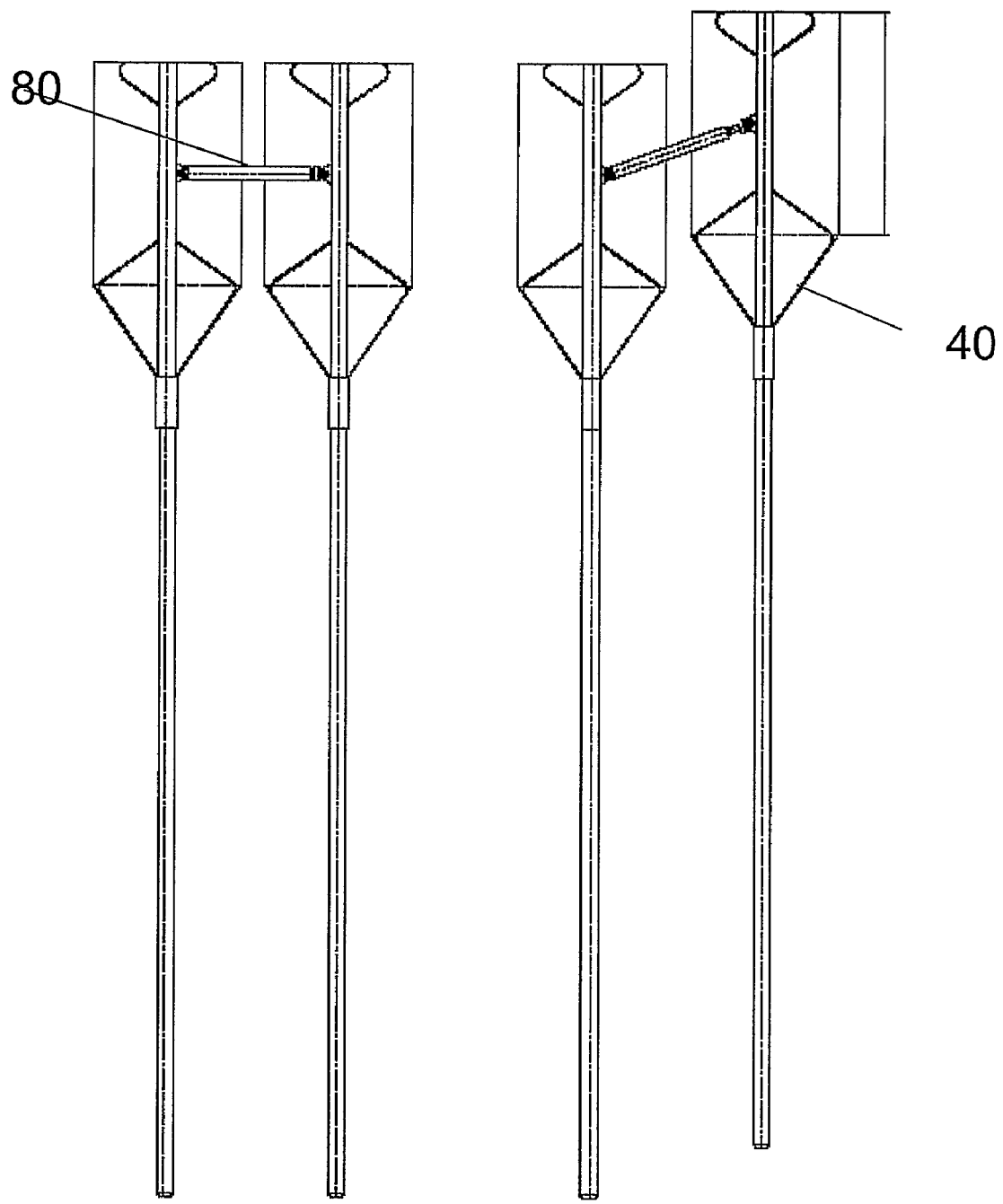
FIG. 7 illustrates an alternative embodiment of the invention, where a hydraulic cylinder is placed between two floating elements, and where the relative motion of the floating elements drives the hydraulic cylinder.

In an alternative embodiment (FIG. 7) the energy is produced by hydraulic cylinders 80 driving the fluid and thereby driving the units.

The generating units 28 utilise the hydraulic pressure to produce electric energy, which is then transferred via the submarine cables 12 to land. The hydraulic fluid at low pressure is then returned to the pump units. The hydraulic system may also include accumulator units for balancing pressure variations. Furthermore, transmission channels in the hydraulic system are preferably provided inside hollow tubes composed of the framework 46, whereby the transmission channels can be shielded from external stresses.

A number of alternative embodiments of the invention may be envisaged. In one alternative embodiment (illustrated in FIG. 7) the float 40 is integrated in a lower part of the framework. Moreover, there are a number of alternative ways of joining the floating units together, where, for example, the attachment means may comprise rails with track wheels, etc.

The invention claimed is:

1. A wave power generating plant, comprising an array of interconnected floating units, where the array is anchored to the seabed via mooring buoys, and where each floating unit comprises an at least partially submerged stabiliser unit and an above-surface structural member, and where each floating unit is further connected to at least one adjacent floating unit by a vertically elongated attachment element of a first floating unit being slidably engaged with a vertically elongated receiving element of the adjacent floating unit, thus allowing relative vertical motion therebetween, and further wherein the relative vertical motion of the floating units due to wave influence is transferred via an energy transmission device to a power-producing unit.

2. A wave power generating plant according to claim 1, wherein:
   a. the floating unit comprises a floating pontoon,
   b. the stabilizing unit comprises an elongated shaft, connected to the floating unit by an articulated joint, wherein a portion of said shaft is submerged and a portion of said shaft rises above the surface, and
   c. wherein the above-surface structural member comprises a frame attached to the above-surface portion of the vertical shaft.

3. A wave power generating plant according to claim 2, wherein the frame is essentially rectangular in cross section, and wherein the elongated attachment element is a protruding element arranged at a corner of the frame of the first floating unit and the elongated receiving element is arranged at a corner of the frame of the adjacent floating unit, said receiving element comprising a hollow channel adapted for receiving the protruding element.

4. A wave power generating plant according to claim 3, wherein the submerged portion of the shaft is filled with ballast.

5. A wave power generating plant according to either of claims 1, 2, 3 or 4, wherein the energy transmission device comprises a hydraulic system comprising a number of pump units for generating pressure in a hydraulic fluid in the hydraulic system, and at least one generating unit for utilizing the pressure generated in the hydraulic fluid for production of electric energy, said pump units being driven by the relative vertical motion of the floating units.

6. A wave power generating plant according to claim 5, wherein the floating units comprise a horizontal toothed rack which, on relative motion of the floating unit relative to adjacent floating units, rotates a cogwheel in the adjacent floating unit, whereupon the cogwheel drives one of the pump units.

* * * * *